Figure 1:
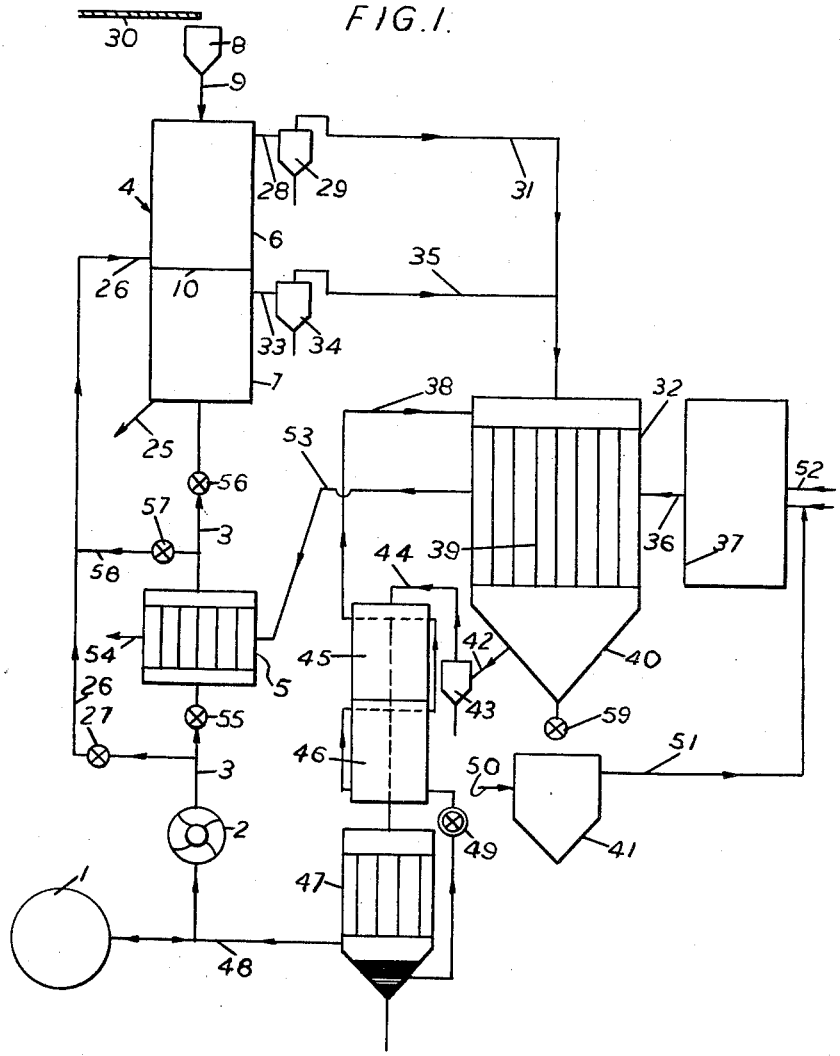

Nov. 15, 1955   L. REEVE ET AL   2,723,902
METHOD FOR THE TREATMENT OF IRON ORE
Filed July 18, 1950   2 Sheets-Sheet 1

*Inventor*
LEWIS REEVE
GEOFFREY WESTON WELLS
By
H.C. Diserens
*Attorney*

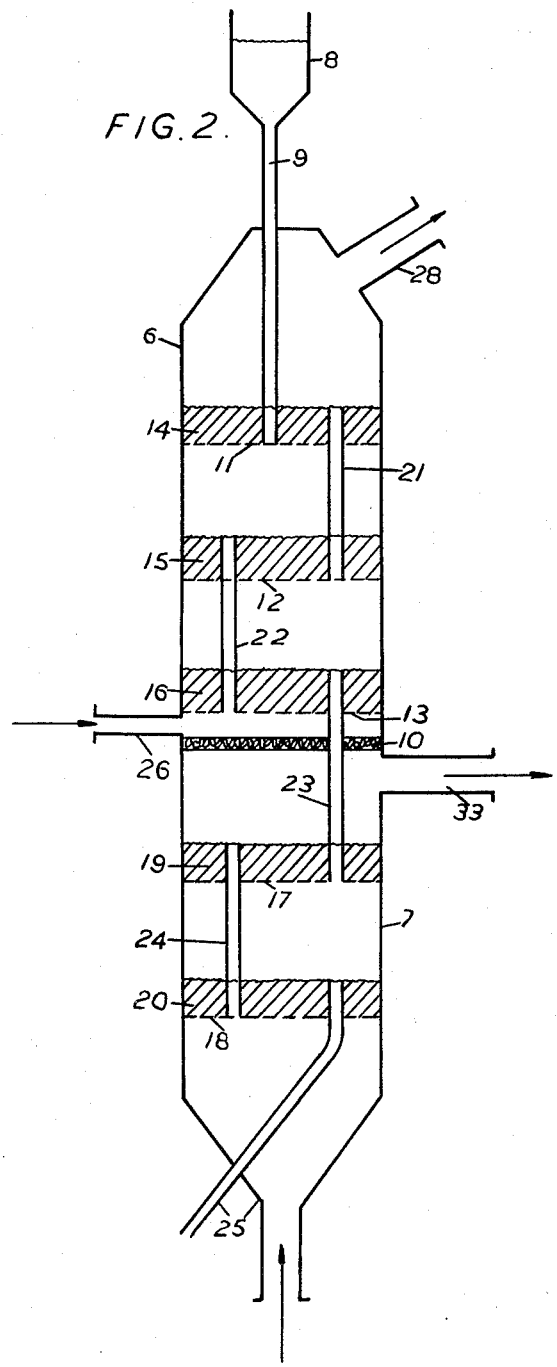

United States Patent Office 2,723,902
Patented Nov. 15, 1955

2,723,902
METHOD FOR THE TREATMENT OF IRON ORE

Lewis Reeve and Geoffrey Weston Wells, Sheffield, England, assignors to The United Steel Companies Limited, Sheffield, England, a British company Application July 18, 1950, Serial No. 174,492

Claims priority, application Great Britain July 21, 1949

6 Claims. (Cl. 23—87)

This invention relates to the treatment of iron ore, especially low-grade ore.

The principal object of the invention is to provide a novel process for the production from low-grade ore of a high-grade iron oxide which may be used for the production of sponge iron by gaseous reduction, or may be used in any other process in which pure iron oxide is required, or may be mixed with less pure ores and sintered, briquetted, pelletised or otherwise agglomerated for use in a blast furnace.

Another object of the invention is to treat iron ore with hydrochloric acid gas to produce ferric chloride in an improved manner.

A further object of the invention is to provide a cyclic process for producing pure ferric oxide from impure ferric oxide by converting the impure oxide to ferric chloride and then converting the ferric chloride to pure ferric oxide.

Still another object of the invention is to provide an improved two-stage process for treating ferric oxide with hydrochloric acid gas to yield ferric chloride.

Yet another object of the invention is to treat fluidised beds of iron ore with hydrochloric acid gas.

A still further object of the invention is to provide an improved plant having a closed gas-circulating system for carrying out the novel process.

The invention is based on the use of hydrochloric acid gas to produce ferric chloride, according to the equation:

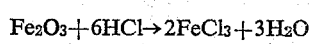
$$Fe_2O_3 + 6HCl \rightarrow 2FeCl_3 + 3H_2O$$

According to the invention ferric chloride is produced in this way and is separated from the ore by volatilisation. It is then treated with steam to produce ferric oxide and hydrochloric acid gas according to the equation:

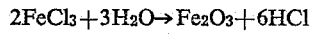
$$2FeCl_3 + 3H_2O \rightarrow Fe_2O_3 + 6HCl$$

This second or "hydrolysis" reaction is the reverse of the first and to ensure that it will proceed in the desired direction, viz. from left to right, it is necessary to use a sufficient concentration of steam at the reaction temperature in accordance with the equilibrium data for this reaction. For example, at 550° C. the use of enough steam to make the gas mixture leaving the reaction chamber contain 80% hydrochloride acid gas and 20% steam will cause the reaction to proceed vigorously from left to right.

Since the second reaction is the reverse of the first, the hydrochloric acid gas, after being separated from the ferric oxide and excess steam, can be utilised for the treatment of further ore. This means in effect that, once the process is in operation, the working costs consist essentially of the cost of the fuel employed and the labour required, and the whole process is extremely economical, so that it becomes economically practicable to utilise low-grade ores to an extent that has hitherto been impracticable.

An important feature of the invention is the treatment of the ore in the form of a fluidised bed, the hydrochloric acid gas being delivered into the ore at such a velocity as to maintain the particles of the ore in a state of turbulence. The ferric chloride produced is carried away from the reaction chamber with excess hydrochloric acid gas, and this gaseous mixture is then treated with steam. As will be appreciated, the fact that there is hydrochloric acid gas in the gaseous mixture which is treated with steam necessitates the use of more steam than would otherwise be required to ensure that the hydrolysing reaction proceeds from left to right.

A further important feature of the invention consists in treating the ore with the hydrochloric acid gas in two stages. The first is a low-temperature stage and is carried on at from 100 to 200° C., that is to say, at a temperature high enough to expel a substantial proportion of the water vapour formed but at the most only a small proportion of the ferric chloride formed. In the second stage the ore is heated with further hydrochloric acid gas at a temperature between 200 and 700° C. to volatilise the ferric chloride already present and to form additional ferric chloride from the ferric oxide remaining in the ore. All this ferric chloride is removed as a gas from the solid residue. By removing the steam at an intermediate stage in the treatment, it becomes possible to drive the first reaction hard to the right and so to remove as ferric chloride a very large proportion of the ferric oxide in the ore.

At the stage at which the ore is treated with hydrochloric acid gas the iron must be present as free ferric oxide, $Fe_2O_3$, with or without combined water. Thus, for example, ores rich in haematite, limonite or geothite may be treated, though it is preferable to roast ores in which the ferric oxide is hydrated to temperatures of from 300 to 500° C. to remove combined water. Ores which, when mined, contain the iron in some other form capable of conversion to ferric oxide may also be treated, provided that the iron compounds in them are first converted to ferric oxide. Thus, ores containing siderite or chamosite may be rendered amenable to the treatment by roasting under oxidising conditions, at from 400 to 800° C., preferably from 400 to 500° C., and those containing magnetite may first be likewise roasted within the same temperature range, preferably at about 500° C. It is immaterial if the gangue constituents of the ores include combined lime and magnesia, as surprisingly only some of this combined lime and magnesia, even when present as carbonate, is attacked by the hydrochloric acid gas to form calcium and magnesium chlorides. However, if ores containing appreciable lime and magnesia are used, it is desirable to treat the lime and magnesia chlorides in the tailings so as to regenerate hydrochloric acid gas. On the other hand ores in which the iron oxide is combined with titania as ilmenite cannot be economically treated according to the invention.

The invention will be more fully understood from the following description, reference being made to the drawings, which show the preferred form of plant and in which Figure 1 is a flow sheet, and Figure 2 diagrammatically illustrates the reaction vessel in which the ferric chloride is formed.

The plant illustrated is wholly closed so far as the gases which take part in the reactions are concerned, and it includes a holder 1 for hydrochloric acid gas which acts as a reservoir to permit fluctuations in the rate of flow of the gas through the plant. The hydrochloric acid gas is forced through the plant by a pump 2, which can draw from the holder 1 as required, and passes from the pump through a pipe 3 to a reaction vessel 4, some of it having first been heated by passage through a heat-exchanger 5.

The reaction vessel 4, shown in Figure 2, contains a low-temperature chamber 6 and a high-temperature chamber 7, and ore preheated to a temperature of 150 to 200° C. is fed to the former from a hopper 8 through a pipe 9. The ore is supplied to the hopper at a controlled rate by a mechanical feeder 30.

The ore should be in the form of fairly fine particles, ranging in size from, say, $\frac{1}{10}$ of an inch in diameter to particles which will just pass through a sieve having 200 meshes to the linear inch. This ore is fluidised, that is to say, maintained in a state of turbulence, by the incoming hot gas, the velocity of which must be high enough for this purpose but not so high as to blow all the particles out of the reaction vessel. The fine particle size is required both to enable the ore to be formed into fluidised beds and to allow the ferric chloride formed to be easily distilled from the ore on reaching the temperature of volatilisation.

The vessel 4 consists of a mild steel shell lined by refractory brick and it is divided into the chambers 6 and 7 by an imperforate diaphragm 10. In the chamber 6 there are three perforated diaphragms 11, 12 and 13 of metal or refractory material which support beds of ore particles 14, 15 and 16, and in the chamber 7 there are two such diaphragms 17 and 18 which support beds of ore particles 19 and 20. The fluidised particles can flow from one bed to the next through pipes 21 to 24, the pipe 23 passing through the diaphragm 10 to lead the particles from the chamber 6 to the chamber 7, and from the last bed 20 the tailings from the reaction leave by a pipe 25.

The hydrochloric acid gas leaving the pump 2 is at or near atmospheric temperature and at a pressure of between 1 and 5 pounds per square inch above atmospheric. Some of this gas, controlled by a valve 27, flows through a pipe 26 to the bottom of the chamber 6, whilst the remainder, controlled by a valve 55, flows through the pipe 3 and the heat exchanger 5. Some of this gas heated in the heat exchanger flows on through the pipe 3 under the control of a valve 56 to the bottom of the reaction chamber 7 and some of it flows through a pipe 58 under the control of a valve 57 to the pipe 26. Thus, the volume and temperature of the hydrochloric acid gas entering the reaction chambers 6 and 7 can be controlled by means of the valves 27, 55, 56 and 57. By means of these controls some of the hydrochloric acid gas at a temperature of between 100° and 200° C., say 170° C., is led to the bottom of the chamber 6. It then flows upwards through this chamber at a linear velocity between 0.2 and 2 feet per second, calculated on the volume of the gas at room temperature through the empty vessel, maintaining each of the beds 14, 15 and 16 in a fluidised state. The ore forming these beds rapidly absorbs the hydrochloric acid gas to produce ferric choride and steam. Very little ferric chloride is distilled at the temperature prevailing in the chamber 6. The reaction is exothermic and if necessary the beds of ore in the chamber 6 may be internally cooled. The steam produced, together with excess hydrochloric acid gas and the small amount of ferric chloride which is volatilised, leaves the chamber 6 by a pipe 28 and passes through a cyclone 29 in which dust is removed from the gas stream, which flows onwards through a pipe 31 to a hydrolysis chamber 32.

The partially chloridised ore enters the chamber 7 through the pipe 23 and here is formed into the fluidised beds 19 and 20 by gas which is controlled as described above and is at a temperature between 200 and 700° C., which is preferably 300 to 400° C. Here the chloridising of the ferric oxide in the ore is completed, and the ferric chloride is distilled out and leaves with the excess hydrochloric acid gas and remaining water of reaction through a pipe 33 leading to a cyclone 34, which is similar to the cyclone 29. From this the gas stream flows through a pipe 35 to the hydrolysis chamber 32.

The fluidised beds in the reaction vessel 4 are highly reactive and allow the reactions to be completed much more rapidly than when larger pieces of ore are treated. Thus, it has been found that the removal of ferric chloride by distillation in a stream of hydrochloric acid gas at about 200 to 300° C. can be completed in times of the order of 1 to 2 hours when the treated ore is crushed to pass through a $\frac{1}{16}$ inch mesh sieve, whereas when pieces up to $\frac{5}{8}''$ are employed the time is extended to as much as 12 hours. A further important and unexpected advantage produced by the use of fluidised beds is that side reactions tending to produce ferric oxychloride, which is non-volatile, appear to be largely eliminated when the ore is fluidised during the main reaction.

In the chloridising steps it is essential to use an excess of hydrochloric acid gas considerably greater than that shown by the chloridising equation, as otherwise the reaction will not go to completion. The excess ranges in practice between two and six times the theoretical quantity calculated from the chloridising equation, the exact figure depending upon the temperature employed for chloridising, increasing with the temperature.

Thus, at a temperature of 300° C., as little as 10% steam in the gases, an amount which corresponds to the use of more than five times the theoretical amount of hydrochloric acid gas, will very considerably reduce the speed of the reaction, whereas in the preferred temperature range of 150 to 190° C. in the chamber 6 as much as 30% steam, corresponding to less than twice the theoretical amount of hydrochloric acid gas, can be tolerated. It will be seen that by carrying out the chloridising reaction in two stages the amount of hydrochloric acid gas required is much less than if one stage is used, since the steam produced in the first stage is removed before the ore enters the chamber 7 to undergo the second and hotter stage of reaction. In this stage the temperature must not rise above 700° C., because at about this temperature the ferric chloride begins to decompose to ferrous chloride. Naturally, it is important to prevent ferrous chloride, which is non-volatile, from being formed.

The presence of air in the reacting gases, or of small quantities of chlorine, is not objectionable; on the contrary it assists in oxidising any ferrous oxide or chloride which may be present.

The hydrolysis chamber 32 is a brick-lined vessel containing vertical refractory or metal tubes 39 heated to temperatures between 400 and 800° C. by the hot gases flowing through a pipe 36 from a combustion chamber 37. Steam, which is super-heated to about the reaction temperature, is injected into the chamber 32 through a pipe 38. The hydrolysis to yield ferric oxide and hydrochloric acid gas takes place in the tubes 39. The ferric oxide produced is deposited on the walls of the tubes in a loose flocculent form and may be easily shaken off to fall through a hopper-shaped bottom 40 of the chamber into a container 41 through a star valve 59. Wires or baffles may be inserted in the tubes 39 to assist in this process and may be periodically vibrated or shaken from outside the chamber.

The reaction gases, which may consist, for example of 80% hydrochloric acid gas and 20% steam at a temperature of from 500 to 600° C., leave the hydrolysis chamber 32 through a pipe 42 and pass through a cyclone 43 into a pipe 44 leading to heat exchangers 45 and 46 in which they are cooled to about 100° C. and from which they enter a water-cooled condenser 47. Here, an aqueous solution of hydrochloric acid is formed by condensation. Most of the gas is uncondensed and flows to the pump 2 through a pipe 48. The condensed solution is forced by a pump 49 to the heat exchanger 46 and acts as the cooling medium for the hot gases flowing through that exchanger and the exchanger 45. This solution is converted into gaseous form in the heat exchangers and leaves them through the pipe 38, which is connected to the exchanger 45. These gases may consist, for example, of about 83% steam and 17% hydrochloric acid gas, and they provide most of the steam used in the hydrolysis chamber 32.

The hot oxide in the container 41 is cooled by cold air which enters at 50 and leaves as hot air through a pipe 51 to be used as air for combustion in the combustion chamber 37, to which fuel is supplied at 52. The combustion gases, after heating the tubes 39 in the chamber 32, flow through a pipe 53 to the heat exchanger 5, where they heat the hydrochloric acid gas flowing to the reaction vessel 4. These waste combustion gases leave the heat exchanger 5 by a pipe 54.

The plant shown may be modified in many respects. For example, in the reaction chamber 4 all the beds are shown of identical diameter throughout, but if desired the diameters of each bed may vary so that in turn the gas velocities vary in such a way as to maintain the fluidising conditions at optimum values. In particular, the gas velocities should increase somewhat as the ore passes downwards through the chamber 6 because the particles will increase in weight as ferric chloride is formed, whilst on the contrary in the lower chamber 7, where the ferric chloride is stripped by the hotter gases and removed from the ore, the optimum gas velocities steadily decrease as the tailings decrease in density. Accordingly, it is preferable for the diameter of the lowest bed 20 to be slightly greater than that of the bed 19 immediately above it, whilst this in turn is preferably of somewhat larger diameter than the bed 16.

Further, the number of beds in the chambers 6 and 7 may be altered, but it is preferable to have at least two in each chamber.

Again, the chamber 6 may be completely separate from the chamber 7, means being provided for feeding treated ore from the chamber 6 to the chamber 7.

The cyclones 29, 34 and 43 may be placed inside the chambers 6, 7 and 32 respectively, instead of outside them.

If desired, the container 41 which receives the hot oxide produced in the hydrolysing chamber 32 may be provided with one or more beds carried on perforated diaphragms so that the ferric oxide produced may be cooled under fluidising conditions by the stream of air from the pipe 50.

Yet again, steam may be supplied to the hydrolysing chamber 32 from an external source instead of using steam separated by condensation from the bulk of the hydrochloric acid gas and then re-formed in a heat exchanger.

As an example of the results that can be obtained, a silicious iron ore after roasting at 400° C. contained 42.1% of iron, 21.4% of silica and 1.92% lime, plus magnesia. 97.1% of the iron content was distilled out of the ore by treatment with hydrochloric acid gas at temperatures up to 400° C., leaving tailings of the following composition:

| | Percent |
|---|---|
| Fe | 3.4 |
| $SiO_2$ | 54.8 |
| $Al_2O_3$ | 23.1 |
| CaO | 3.7 |
| MgO | 1.1 |
| Cl | 5.9 |

The tailings also contained practically all the sulphur and phosphorus of the original ore.

The ferric chloride produced was hydrolysed in an atmosphere containing approximately 20% of steam and 80% of hydrochloric acid gas at a temperature of 500° C. and yielded ferric oxide containing 69.0% Fe (the theoretical figure for $Fe_2O_3$ being 69.9%) with only traces of sulphur, phosphorus and silicon.

As another example, an ore containing 41.7% iron, 14.8% silica and 8.0% lime was treated. The percentage of iron removed as ferric chloride was 94%, whilst the tailings contained 8.7% chloride, 17.3% lime and 1.55% magnesia. It will be noted that the amount of chloride in the tailings represents only about 36% of that required to combine with all the lime and magnesia.

We claim:

1. A process for obtaining substantially pure ferric chloride from iron ore containing ferric oxide but substantially free from titania which comprises first treating the ore with hydrochloric acid gas at a temperature high enough to vaporize water resulting from such treatment but not exceeding 200° C., thereby producing ferric chloride and water vapor, separating from the ore a substantial proportion of said water vapor with not more than a small amount of ferric chloride, then treating the ore with further hydrochloric acid gas at a temperature between 200 and about 400° C. to volatilize both the ferric chloride already present and additional ferric chloride formed from the ore, and removing the volatilized substantially pure ferric chloride from the solid residue.

2. A process according to claim 1 in which the ore is crushed into finely divided form, is treated in a plurality of stages and is fluidized by the gas during the treatment in each stage, the fluidized material flowing from one stage to another for treatment at succesively higher temperatures.

3. A process according to claim 2 in which the temperature of the hydrochloric acid gas is between 150 and 190° C. in one stage of said treatment and between 250 and 400° C. in a subsequent stage of said treatment.

4. A process according to claim 1 in which the volatilized ferric chloride removed from the solid residue is treated with steam to convert it to substantially pure ferric oxide.

5. A process according to claim 4 in which the steam treatment is effected at a temperature between 500 and 600° C.

6. A process according to claim 4 in which the gases from the steam treatment are cooled to condense excess steam, and in which the hydrochloric acid gas is separated from the condensed steam, and the steam is reformed and used for treatment of more ferric chloride.

References Cited in the file of this patent

UNITED STATES PATENTS

| | | |
|---|---|---|
| 1,916,853 | Westcott | July 4, 1933 |
| 1,917,789 | Bacon et al. | July 11, 1933 |
| 1,967,235 | Ferkel | July 24, 1934 |
| 1,992,685 | Westcott | Feb. 26, 1935 |
| 2,036,664 | Westcott | Apr. 7, 1936 |
| 2,070,161 | Flinn | Feb. 9, 1937 |
| 2,176,242 | Bowes | Oct. 17, 1939 |
| 2,291,206 | Bowes | July 28, 1942 |
| 2,378,675 | Agnew | June 19, 1945 |
| 2,436,870 | Murphree | Mar. 2, 1948 |
| 2,471,844 | Strelzoff | May 31, 1949 |
| 2,621,118 | Cyr et al. | Dec. 9, 1952 |

OTHER REFERENCES

Kite et al., "Fluidization in Non-Catalytic Operations," Chem. and Met. Eng., vol. 54, No. 12, pages 112–115, 1947.